Sept. 5, 1933.     C. M. MORGAN     1,925,455
CONTROL SYSTEM FOR HEATING PLANTS
Filed April 8, 1931     3 Sheets-Sheet 1
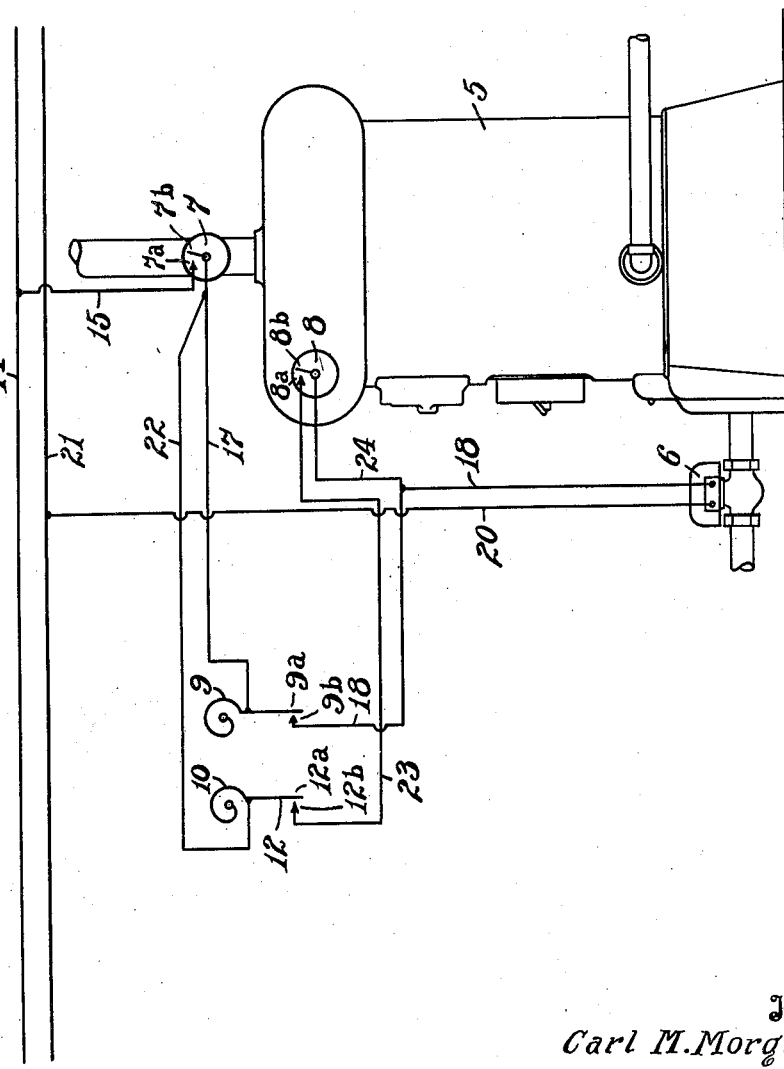
Inventor
Carl M. Morgan,
By   Hood + Hahn.
Attorneys

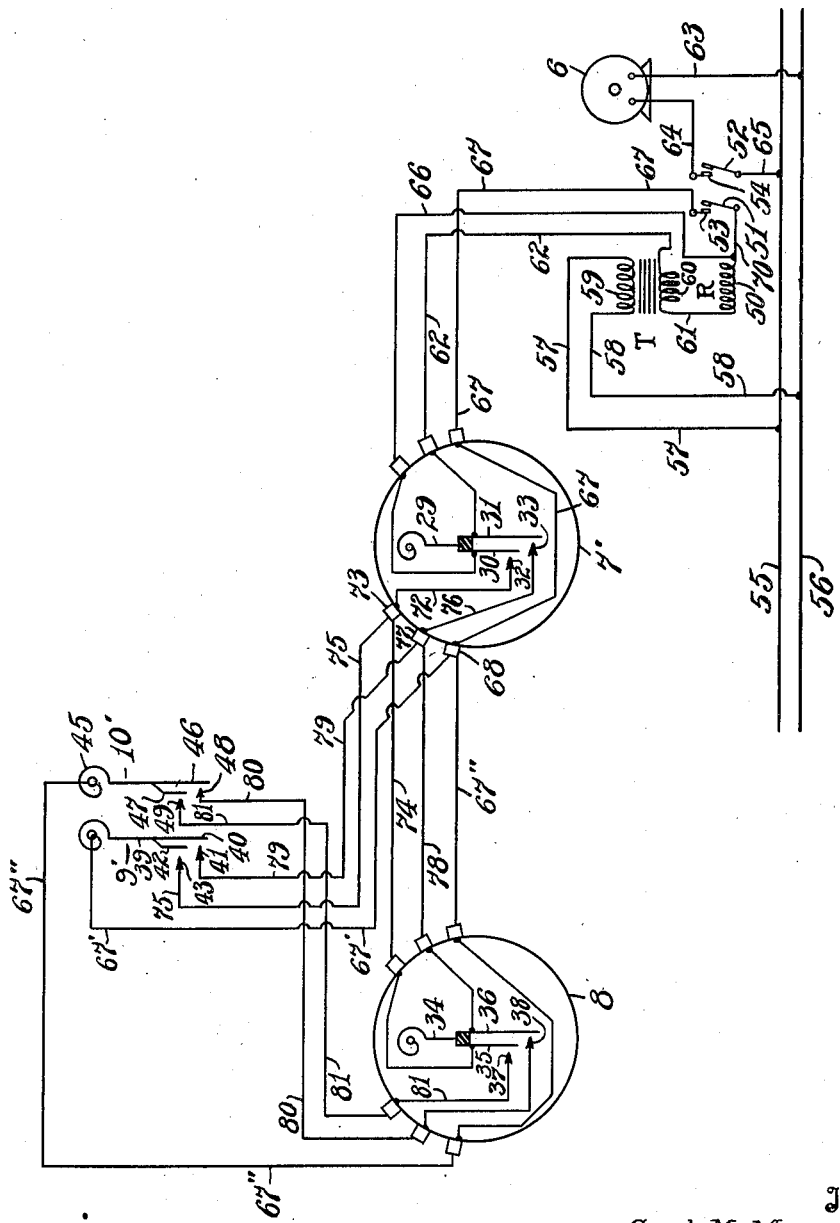

Sept. 5, 1933.  C. M. MORGAN  1,925,455
CONTROL SYSTEM FOR HEATING PLANTS
Filed April 8, 1931   3 Sheets-Sheet 3
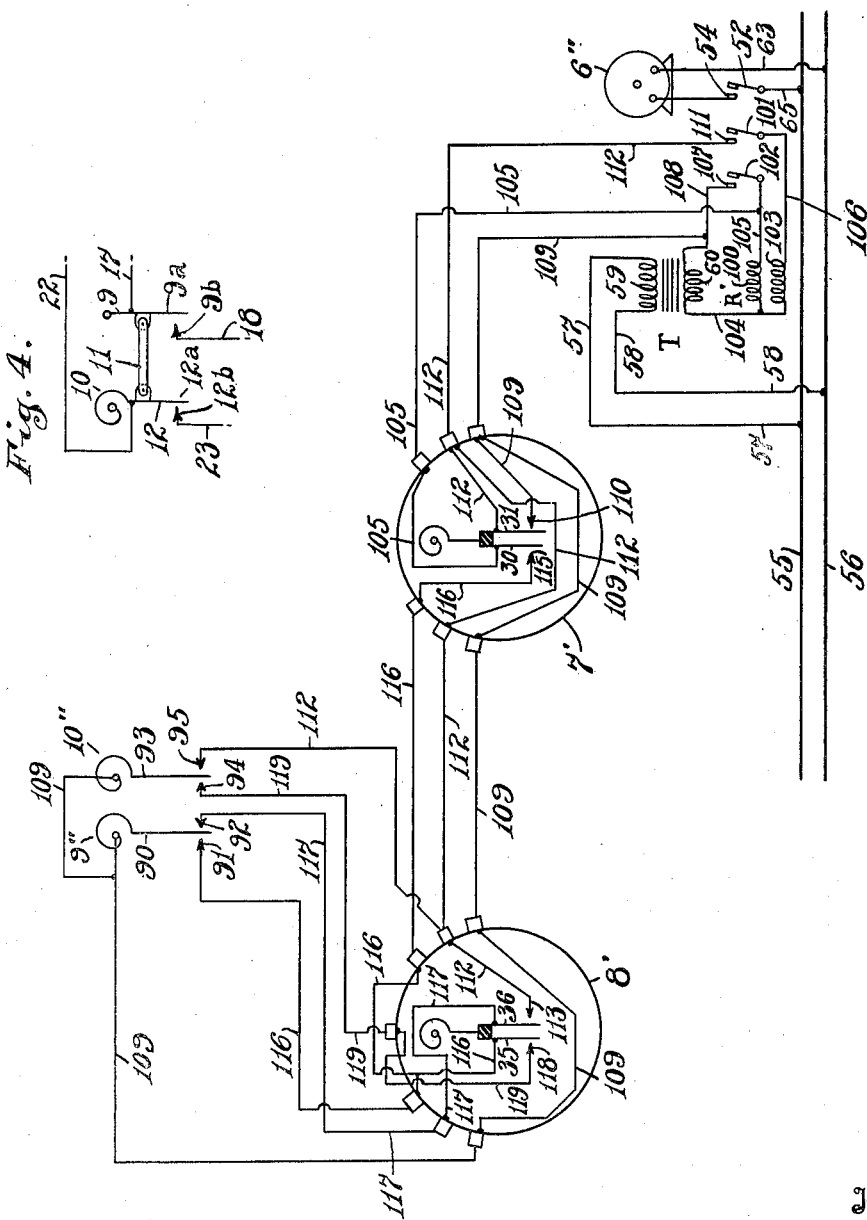
Inventor
Carl M. Morgan,
By Hood + Hahn.
Attorney Patented Sept. 5, 1933

1,925,455

UNITED STATES PATENT OFFICE 1,925,455

CONTROL SYSTEM FOR HEATING PLANTS

Carl M. Morgan, Portland, Maine, assignor to Minneapolis-Honeywell Regulator Company, Minneapolis, Minn., a corporation of Delaware Application April 8, 1931. Serial No. 528,550

18 Claims. (Cl. 236—9)

In the operation of heating plants for houses, where the heater is automatically controlled as to its heat-delivery capacity by a room thermostat placed in the space to be heated and so responsive to temperature conditions within the space to be heated that, when the temperature of that space drops to a predetermined minimum, the heater will be activated and when the temperature of the space to be heated rises to a predetermined maximum the heating of the heater will be discontinued, a condition often rises where the room thermostat will remain satisfied for so long a period that the heat-delivery unit may, because of long discontinuance of the application of heat thereto, become so cold as to be incapable of responding promptly to a demand for heat by the room thermostat when the temperature of the space to be heated drops to a predetermined minimum.

Under such conditions, circulation of air in the space to be heated becomes so sluggish that the air becomes stratified and a layer of cold air, at a temperature below the minimum setting of the room thermostat (which is usually arranged about shoulder high), is formed in the room, and the room becomes uncomfortable for the occupants. Such a condition is commonly referred to in the art as a "cold 70" because room thermostats are commonly set to maintain a room temperature of 70° F.

Various devices have been heretofore provided in attempts to automatically prevent the above mentioned stratification of air in the room. Some of these devices embody what has been termed a "low limit control" arranged to be so responsive to the temperature conditions of the main heater that said heater will be activated, irrespective of room temperatures, when the temperature of the main heater falls to a predetermined minimum; others have embodied heat responsive mechanism so responsive to the temperature condition of the local heat-delivery unit as to accelerate the main heater when the temperature of the local heat-delivery unit falls to a predetermined minimum; and others have embodied mechanism, either independently acting or acting in conjunction with an element responsive to temperature conditions of the local heat-delivery unit, to be responsive to temperature conditions outside of the space to be heated so as to cause acceleration of the main heater independent of temperature conditions of the space to be heated, when the outside temperatures drop to a predetermined minimum.

Each of the above-mentioned systems fails, in one or more particulars, to so control the acceleration of the main heater in an entirely satisfactory manner and the object of my present invention is to provide a control system which will adequately control the delivery of heat by a local heat-delivery unit in such manner as to continuously maintain the local heat-delivery unit in a condition to promptly respond to the heat requirements of the space to be heated without over-heating that space and with a minimum fuel consumption.

The accompanying drawings illustrate, diagrammatically, three forms of apparatus embodying my invention.

Fig. 1 is a diagram showing a simple form of the invention with single point switches and circuits of uniform voltage;

Fig. 2 is a diagram of the system providing high voltage for the heater accelerator and low voltage circuits for the remainder of the system;

Fig. 3 is a diagram of another embodiment using circuits of two voltages and a balanced relay; and Fig. 4 is a diagram illustrating a room-thermostat unit in which a single thermostatic element actuates both the primary room controls and the supplemental room contacts.

Referring first to Fig. 1, 5 indicates the main heater which may be of any desired type capable of delivering a circulating medium to a local heat-delivery unit located in the space to be heated.

Heater 5 is energized by an element 6 which may be either a fuel-control valve, a damper-control motor, a fuel-delivery motor, or any other well known unit by means of which the heating of the main heater 5 may be controlled. The element 6, or its equivalent will be referred to as an accelerator for the heater.

Associated with heater 5 is a thermostatic element 7 having electrical contacts which remain closed so long as the temperature or pressure within the heater 5 does not exceed a predetermined maximum and open when that maximum is attained. This element is advantageous but is not an essential of my control and will be called a high-limit control.

Also associated with heater 5 is a low-limit control for the heater, which is a thermostatic element 8 comprising electrical contacts which remain open so long as the temperature or pressure of the main heater 5 is above a predetermined minimum and automatically close when the heater drops to that minimum.

Located in the space to be heated is the usual room thermostat 9 so adjusted that its terminals 9a and 9b will be contacted when the room temperature drops to a predetermined minimum, say 70° F. Also arranged in the space to be heated are two associated terminals 12a and 12b to be automatically contacted as a result of room temperature drop to a predetermined minimum somewhat in advance of the contacting of terminals 9a and 9b.

The automatic contacting of terminals 12a and 12b may be obtained either by an independent supplemental thermostatic element 10, carrying one of said terminals, or one of said terminals may be coupled with the thermostat 9 in such manner, say by a coupling bar 11 shown in Fig. 4, that terminal 12a will be contacted with terminal 12b at a temperature slightly higher than the temperature at which thermostat 9 would cause terminal 9a to contact with terminal 9b. Such compound-contact thermostats are well known and in Figs. 1 to 3 I have indicated the main room thermostat and the supplemental room thermostat as separate instruments for the sake of clearness of illustration.

The circuit connections are as follows:—Line wire 14 is connected by wire 15 with terminal 7a of the high-limit control 7, and the movable terminal 7b of said high-limit control is connected by wire 17 with terminal 9a of the room thermostat 9. Terminal 9b of room thermostat 9 is connected by wire 18 to one side of the heater control unit 6 and the other side of said heater control unit 6 is connected by wire 20 with the other line wire 21. The wire 22 connects terminal 7b of the high-limit control 7 with terminal 12a and terminal 12b is connected by wire 23 with one terminal 8a of the low-limit control 8. Terminal 8b of low-limit control 8 is connected by wire 24 with wire 18 (or one side of unit 6).

The operation is as follows:—Under normal conditions the contact at 7a—7b will remain closed but whenever the heat conditions of the heater 5 reach a predetermined maximum this contact will be broken and, irrespective of the condition of any other portion of the system, the heater 5 cannot be stimulated until the heat conditions of the heater 5 have dropped below the predetermined maximum.

Assuming operation during cold weather and that the low-limit control 8 is adapted to close at a heater temperature of 100° F.; the room thermostat 9 to close at a room temperature of 70° F.; and the supplemental thermostat 10 adjusted to close two degrees in advance of the closing of thermostat 9. The minimum temperature condition of the heater 5 is under the joint control of the low-limit control 8 and the supplemental room thermostat 10, the circuit being 14, 15, 7a, 7b, 22, 12a, 12b, 23, 8a, 8b, 24, 18, 6, 20, 21.

Whenever the room temperature drops to close the gap 12a—12b and the heater 5 is also below its minimum (say 100° F.) the above-mentioned circuit is completed through the contacts 12a—12b and 8a—8b and unit 6 will be energized to accelerate the heater 5 and whenever the room temperature rises above the minimum setting of 10 or the heater rises above the limit set by element 8, this energizing circuit of unit 6 will be broken and further acceleration of the heater 5 will be discontinued until there is a call for heat by the primary room thermostat 9, say when the room temperature drops to 70° F., whereupon the circuit 15, 7a, 7b, 17, 9a, 9b, 18, 6, 20, 21 is completed to energize unit 6 and thus accelerate the heater 5 until this circuit is broken at 9a—9b.

It will be seen from the above that the co-operative effect of the low-limit control unit 8 and the supplemental room thermostat unit 10 upon unit 6 is such that the minimum heat-delivery capacity of the heater 5 is dependent not only upon the temperature or pressure condition of the heater 5 but also is dependent upon the temperature condition of the space to be heated so that if the heater is in condition to promptly respond to a call for heat by the primary room thermostat, i. e., has a temperature-delivery capacity at or above that determined by the setting of unit 8, a closing of the contacts 12a—12b will have no stimulating effect upon the heater 5 but if, by reason of a long-satisfied period of the primary room thermostat 9, the heat-delivery capacity of the heater 5 has been allowed to drop too low, the closing of the contacts 12a—12b some time before an expected call for heat by the primary room thermostat 9 will stimulate heater 5 sufficiently in advance of a call for heat by thermostat 9 to either avoid that call or to put the heater 5 in condition to more promptly respond to the call of room thermostat 9 when it is made.

It will also be noted that, in the absence of the supplemental room thermostat 10, the low-limit control unit 8 would prevent the heater 5 from ever dropping below a heat-delivery capacity determined by the setting of unit 8 and if this unit 8 were set to provide adequate control in cold weather then, in warmer weather, the heater 5 would be maintained at or above its minimum for periods of such length as to result in over-heating of the room.

It should be understood in this connection that if separate thermostatic units 9 and 10 are used and unit 10 be placed at a lower level from unit 9 it may be so adjusted as to cause closing of the contacts 12a and 12b at the same or even lower temperatures than those for which thermostat 9 is set, but nevertheless in advance of the closing of the gap 9a—9b, yet the above described results be attained.

The fundamental characteristic of the control resides in the provision of two means for causing stimulation of the heater, one of which is responsive to room temperatures, and the other of which is jointly responsive to room temperatures and a minimum heat-delivery capacity of the heater.

Fig. 2, 6' indicates the heater accelerator unit, 7' a high-limit control for the heater 5, 8' the low-limit control for heater 5, 9' the room thermostat unit, and 10' the supplemental room thermostat unit.

The high-limit control 7' is an instrument responsive to temperature or pressure conditions in the heater and comprises a movable arm 29 which carries a main terminal 30 and a holding-circuit terminal 31 adapted to contact respectively with terminals 32 and 33.

The low-limit control 8' is similar to the instrument 7' and comprises a movable arm 34 carrying the main terminal 35 and the holding-circuit terminal 36 adapted to contact respectively with terminals 37 and 38.

Room thermostat 9' is of the well known two-terminal, retaining-circuit type consisting of a heat responsive blade 39, the spring holding-circuit terminal 40 adapted to contact with terminal 41 and terminal 42 adapted to contact with terminal 43 after terminal 40 has contacted with terminal 41.

A supplemental room thermostat 10' is similar to thermostat 9' and comprises a heat responsive blade 45 carrying the spring holding-circuit terminal 46 and a finger terminal 47 adapted to contact respectively with the fixed terminals 48 and 49, finger 47 coming into contact with terminal 49 after terminal 46 is contacted with terminal 48.

The relay R comprises a coil 50, the movable holding-circuit terminal 51, the movable high-voltage terminal 52 and fixed terminals 53 and 54 for cooperation with the movable terminals 51 and 52 respectively.

The parts are wired as follows:—

The line wires 55, 56 are connected respectively by wires 57 and 58 with the opposite ends of the primary coil 59 of transformer T. The secondary coil 60 of transformer T has one end connected by wire 61 with one end of coil 50 and its other end connected by wire 62 with therminal 31 of the high-limit control 7'.

The heater accelerator 6' is connected by wire 63 with line wire 56 and by wire 64 with terminal 54, and terminal 52 is connected by wire 65 with the other line wire 55. The other end of the relay coil 50 is connected by wire 66 with terminal 30. Terminal 53 is connected by wire 67 with a binding post 68 from which branches 67' and 67" lead respectively to the blades 39 and 45 (and hence respectively to the terminal pairs 40—42 and 46—47) of the room thermostats 9' and 10'.

It should be understood that in this form, as in the form shown in Fig. 1, the terminals 46—47 may be actuated by the same thermostatic blade which actuates the terminals 40—42 if arranged to contact at a higher temperature.

Coil 50 is connected at one end by wire 70 with the movable terminal 51. Terminal 32 is connected by wire 72 with a post 73 which is connected by wire 74 with the movable terminal 35 and by wire 75 with terminal 43.

Terminal 33 is connected by wire 76 with a binding post 77 which is connected by wire 78 with terminal 36 and by wire 79 with terminal 41.

Terminal 48 is connected by wire 80 with terminal 38 and terminal 49 is connected by wire 81 with terminal 37.

Terminals 30 and 31 are insulated from each other, and terminals 35 and 36 are insulated from each other, as indicated in Fig. 2.

In this form of my device the heater accelerator 6' is energized by high voltage current while the remaining portions are energized by low voltage.

Terminals 30 and 31 of the high limit control element 7' will normally be in contact with terminals 32 and 33 respectively, and will remain in contact with an undesired high maximum of heater condition is attained, whereupon terminals 30 and 31 will be separated from terminals 32 and 33 by the action of the responsive element 29.

So long as the heat delivery capacity of heater 5 is at or above a predetermined minimum terminals 35 and 36 of the low limit control element 8' will be out of contact with terminals 37 and 38 respectively, and when the heat delivery capacity of heater 5 drops to the predetermined minimum said terminals will be brought into contact with said terminals by the responsive element 34.

Assuming a furnace condition above the setting of instrument 8' and below the setting of instrument 7' and room temperatures above the settings of instruments 9' and 10', terminals 30 and 31 will be in contact with terminals 32 and 33 respectively, and all of the other contacts will be separated and the accelerating element 6' will be inactive. When the room temperatures drop sufficiently, terminal 46 will first come into contact with terminal 48, followed rather promptly by a contacting of terminal 47 with terminal 49, but as terminals 35 and 36 are separated from terminals 37 and 38, no action will result from contacting between 46—48 and 47—49. Lowering of room temperature to a sufficient extent, adjacent instrument 9', will bring terminal 40 into contact with terminal 41 and terminal 42 into contact with terminal 43, thus establishing the circuit 60, 62, 31, 33, 76, 77, 79, 41, 40, 42, 43, 75, 73, 72, 32, 30, 66, 50, 61, 60, thus energizing relay R and bringing terminals 51 and 52 into contact respectively with terminals 53 and 54. The closing of contacts 52—54 completes the energing circuit 55, 65, 52, 54, 64, 6', 63, 56, for the heater accelerator 6'. The closing of the contacts 51—53 completes the holding circuit 60, 61, 50, 70, 51, 53, 67, 68, 67', 39, 40, 41, 79, 77, 76, 33, 31, 62, 60, which is independent of the contacts 42—43 and will persist until the room thermostat 9' warms up enough to cause separation of terminal 40 from terminal 41 even though terminal 42 separates from terminal 43. This is a well-known form of holding circuit.

Under the specified conditions, element 6' will continue in operation until the temperature surrounding the instrument 9' has been raised to the required maximum, unless an undesirable heat condition of the heater is attained, whereupon instrument 7' will produce a break at 31—33 which will deenergize coil 50 and thus cause a break in the circuit of element 6' at 52—54.

If instrument 9' remains satisfied through a long period the heat delivery capacity of the heater will drop to the predetermined minimum so that terminals 35 and 36 will contact with terminals 37 and 38 respectively and thereupon, whenever there is established a contacting of terminals 46 and 47 with terminals 48 and 49, respectively, the following circuits are established: 60, 61, 50, 66, 30, 32, 72, 73, 74, 35, 37, 81, 49, 47, 46, 48, 80, 38, 36, 78, 77, 76, 33, 31, 62, 60, thus energizing coil 50 so as to close the circuit of 6', at 52—54, as stated above, and so as to close, at 51—53, the holding circuit 60, 61, 50, 70, 51, 53, 67, 68, 67", 45, 46, 48, 80, 38, 36, 78, 77, 76, 33, 31, 62, 60, which will persist, so as to maintain the circuit for element 6' at 52—54, until there is a circuit break at 46—48, due to rise in temperature adjacent instrument 10', or there is a sufficient rise in temperature of the heater to cause a break at 36—38, thus assuring a conditioning of the heater which will enable it to respond promptly if a call for heat is made by instrument 9'.

Referring now to Fig. 3, the primary room thermostat 9" comprises a bi-metallic thermostatic blade 90 adapted to play between the two fixed terminals 91 and 92, and similarly the supplemental room thermostat 10" comprises the bi-metallic thermostatic blade 93 adapted to play between the two fixed terminals 94 and 95. Here also it should be remembered that blade 93 may, if desired, be merely a switch element thermostatically-actuated by blade 90 but is diagrammatically shown as independent for the sake of clearness.

Relay R' comprises an actuating coil 100 adapted, when energized, to simultaneously close the switch 52 for the circuit of 6", the holding-circuit switch 101 for the balancing coil, and the holding-circuit switch 102 for the main relay coil and a balancing coil 103 which, when energized, renders ineffective the energization of coil 100 so as to permit the switches 52, 101 and 102 to resume normal open position.

One end of the secondary 60 is connected by wire 104 with coils 100 and 103. The other end of coil 100 is connected by wire 105 with switch 102 and with terminal 30. The other end of coil 103 is connected by wire 106 with switch 101. Arranged to be contacted by switch 102 is a terminal 107 connected by wire 108 with the other end of secondary 60 and the last mentioned end of secondary 60 is connected by a wire 109 with terminal 110 and with blades 90 and 93, terminal 110 being arranged to be contacted by terminal 31 when a predetermined high limit is reached in the heater.

A terminal 111 is associated with switch 101 and is connected by branched wire 112 with terminal 31 and terminals 113 and 95, terminal 113 being arranged to be contacted by terminal 36 when the heater is above a predetermined low limit and terminal 95 arranged to be contacted with blade 93 when it is retracted from terminal 94.

A terminal 115 is arranged to be normally contacted by terminal 30 when the associated terminal 31 is retracted from its terminal 110 by a heater condition below the predetermined high limit and this terminal 115 is connected by branched wire 116 with terminal 35 and terminal 91. A wire 117 connects terminals 36 and 92. A terminal 118, arranged to be contacted by terminal 35 when terminal 36 is retracted from terminal 113 by a heater condition at or below the predetermined low limit, is connected by wire 119 with terminal 94.

In this form, when the primary heater 5 is in a heat-delivery condition at or above the low limit established by the setting of instrument 8' and below the undesired maximum established by the setting of instrument 7', and the room temperatures are above the temperatures for which instruments 9" and 10" are set, terminals 30—115, 36—113, 90—92, and 93—95 are in contact, terminals 52, 101 and 102 are separated from their respective terminals 54, 111 and 107, coils 100 and 103 are deenergized, and the heater accelerator 6" is inactive.

When the room temperature adjacent instrument 10" drops sufficiently, terminal 93 contacts with terminal 94, such contacting taking place prior to a contacting of terminal 90 with terminal 91. If, at this time, the heat delivery capacity of the primary heater is below that for which the low-limit control 8' is set, terminal 35 will be in contact with terminal 118 and the following circuit will be established: 60, 109, 93, 94, 119, 118, 35, 116, 115, 30, 105, 100, 104, 60, thus energizing relay R' to close terminals 52, 101 and 102 respectively upon their associated terminals 54, 111 and 107.

The closing of terminals 52—54 activates the heater accelerator 6" through the circuit 55, 65, 52, 54, 6", 63, 56. The closing of terminals 102—107 establishes the holding circuit 60, 108, 107, 102, 105, 100, 104, 60, to hold the relay R' energized until the balancing coil 103 is energized.

The closing of terminals 101—111 does not establish a circuit through the balancing coil 103 owing to the breaks at 31—110 and 36—113.

In due course the primary heater will become sufficiently heated to cause a retraction of terminal 35 from terminal 118 and a contacting of terminal 36 with terminal 113 and if the room thermostat 9" is satisfied, with terminal 90 contacting with terminal 92, the circuit 60, 109, 90, 92, 117, 36, 113, 112, 111, 101, 106, 103, 104, 60, energizes the balancing coil 103 and releases switches 52, 101, and 102, so as to deenergize the entire system and stop the accelerator 6".

If the temperature adjacent the supplemental room thermostat 10", prior to a satisfaction of the low-limit control 8" rises sufficiently to cause a contacting of terminal 93 with terminal 95 the circuit 60, 109, 93, 95, 112, 111, 101, 106, 103, 104, 60, will energize the balancing coil 103 and thus cause circuit breaks at 102—107, 101—111 and 52—54.

When the heat delivery capacity of the primary heater drops so as to cause contacting of 35 with 118, and the temperature adjacent the supplemental room thermostat 10" drops to cause contacting of 93 with 94, the circuit 60, 109, 93, 94, 119, 118, 35, 116, 115, 30, 105, 100, 104, 60, is established to cause closing of the gaps at 52—54, 101—111, 102—107 and the accelerator 6' will be continued in operation until 93 contacts with 95 or 36 contacts with 113 and 90 contacts with 92.

In this form, as in the two preceding forms, a shifting of the high-limit control from its normal operative position to an abnormal position due to the attainment of a predetermined maximum heat delivery capacity, serves to disconnect the remainder of the control apparatus from dominance of the heater. When the predetermined maximum heat condition is attained in the heater contact 30 is separated from contact 115 and contact 31 engaged with contact 110, thus establishing the circuit 60, 109, 110, 31, 112, 111, 101, 106, 103, 104, 60, thus energizing coil 103 so as to balance the energization of coil 100 and result in circuit breaks at 52—54, 101—111 and 102—107.

The high limit control is a desirable but not essential element of the combination in any one of the forms.

The following terms, used in the claims, are defined as follows:

"Heater", a means, such as a warm-air furnace, a hot water or steam boiler, etc. for heating a circulating medium which is to be delivered to one or more local heaters.

"Heater accelerator", a mechanism for controlling the increase of heat delivery capacity of the heater. This may be a mechanism for delivering fuel, or applying heat to the heater, or for stimulating the rate of fuel consumption in the heater, or other similar device.

"High limit control", an element responsive to conditions of the heater at a predetermined maximum;

"Low limit control", an element responsive to heater conditions at a predetermined minimum.

"Room thermostat", an element responsive to temperature conditions in a space to be heated by a local heater receiving a heating medium from the heater.

"Supplemental room thermostat", an element responsive to temperature conditions in the space to be heated, which, upon decrease of temperature in the space to be heated, will come into an accelerator-activating position in advance of the attainment of an accelerator-activating position of the room thermostat. The supplemental room thermostat may be, as previously stated, either an independently-responsive thermostatic element placed either in the vicinity of the room thermostat or at a remote position within the space to be heated, or may be an element actuated by the room thermostat.

I claim as my invention:

1. A heater accelerator, a low-limit control responsive to heater conditions at a predetermined low limit, a room thermostat, a supplemental room thermostat, and intermediate connections between said accelerator, low-limit control, room thermostat, and supplemental room thermostat whereby the heater accelerator will be activated upon attainment of a predetermined minimum position of the room thermostat or when both the supplemental room thermostat and the low limit control have attained predetermined minimum positions and the heater accelerator will be put in non-accelerating position when both the room thermostat and low-limit control are satisfied.

2. A heater control comprising a heater accelerator, a low-limit control comprising a pair of cooperating terminals and means responsive to heater conditions for relatively shifting said terminals at a predetermined minimum heater condition, a pair of relatively movable room-thermostat terminals, a pair of relatively movable supplemental-room-thermostat terminals, thermostatic means responsive to temperature conditions in a space to be heated by the heater for relatively shifting said room terminals, said thermostatic means being operable to move the suplemental room thermostat pair into accelerator-activating position in advance of accelerator-activating postioning of the room thermostat pair; and electrical connections providing two parallel circuits, one including the supplemental room thermostat pair, the low-limit pair, and the accelerator; and the other including the room thermostat pair and the heater accelerator.

3. A heater control comprising a heater accelerator, a low-limit control comprising a pair of cooperating terminals and means responsive to heater conditions for relatively shifting said terminals to contact the same upon a drop of heater condition to a predetermined minimum, a pair of relatively movable room-thermostat terminals, a pair of relatively movable supplemental room-thermostat terminals, thermostatic means responsive to temperature conditions in a space to be heated by the heater for relatively shifting said room terminals to contact the same upon drop of room temperatures to predetermined minimums, the supplemental room thermostat terminals contacting in advance of the room thermostat terminals; and electrical connections connecting the room thermostat pair and supplemental room thermostat pair in parallel circuits; one of said circuits including the room thermostat pair and the heater accelerator; and the other of said circuits including the supplemental room thermostat pair, the low-limit control pair, and the heater accelerator.

4. A heater control comprising a heater accelerator, a high-voltage-circuit therefor embodying a switch, a relay for actuating said switch, a transformer, a holding circuit switch also actuated by said relay, a low-limit control comprising a movable terminal and an associated relatively-insulated movable holding-circuit terminal and two relatively-insulated terminals coacting with said two movable terminals, means responsive to heater conditions for automatically shifting said last-mentioned movable terminals into contacts with their associated terminals upon drop of heater conditions to a predetermined minimum, a movable room-thermostat terminal and an associated holding-circuit terminal, a movable supplemental-room-thermostat terminal and an associated holding-circuit terminal, four room thermostat terminals arranged respectively to be engaged by the movable room thermostat terminal, its associated holding-circuit terminal, the movable-supplemental-room-thermostat terminal and its associated holding-circuit terminal, temperature-responsive means for shifting the movable-room-thermostat terminal and movable supplemental - room - thermostat terminal into contact with their associated terminals upon drop of room temperature, the holding circuit terminals contacting in advance of contacting of the associated movable terminals and the supplemental-room-thermostat terminals contacting in advance of the room thermostat terminals, and electrical connections connecting the transformer secondary with the relay coil through the room thermostat terminals, and connecting the transformer secondary with the relay coil through the room-thermostat holding-circuit terminals independent of the main room thermostat terminals and connecting the transformer secondary with the relay coil through the movable low-limit terminal the movable supplemental room thermostat terminal and the movable holding-circuit terminal actuated by the relay, and connecting the transformer secondary and the relay coil with the room thermostat movable terminal, the associated holding-circuit terminal and the relay holding-circuit terminal independent of the supplemental room thermostat terminals and the low-limit-control terminals, and connecting the transformer secondary with the relay coil through the low-limit-control holding-circuit terminal and the relay holding-circuit terminal independent of the room thermostat terminals.

5. A heater control comprising a heater accelerator, a high voltage circuit therefor including a switch, a relay of the balanced coil type for actuating said switch, a relay holding-circuit switch actuated by the relay, a relay-actuated balancing-circuit switch, a transformer, a low-limit-control switch comprising two relatively-insulated synchronously-movable switches, associated terminals arranged for alternate contacting by the switches and switch-actuating means responsive to a predetermined minimum heater condition, a two-position room switch, a two-position supplemental room switch, thermostatic means responsive to room temperatures for shifting said room switches to contact the supplemental room switch in advance of contacting the room switch in response to room temperature drop to a predetermined minimum range, and electrical connections connecting the transformer secondary and the relay-energizing coil with one point of the room switch, and connecting said secondary and the relay-energizing coil with one of the low-limit control switches and one point of the supplemental room switch, and connecting said secondary and the energizing coil with the relay-holding-circuit switch, and connecting the transformer secondary and the relay-balancing-coil with the relay-actuated balancing-coil switch, the other switch of the low-limit control and, in branch circuits, with the other points of the room switch and the supplemental room switch.

6. In combination, an electrical heater accelerator, a contact controlling room thermostat for operating the electrical heater accelerator to maintain a predetermined room temperature, a contact controlling low limit control responsive to heater conditions at a pre-determined low limit for operating said electrical heater accelerator to maintain a pre-determined minimum temperature at the heater, irrespective of the temperature at the room thermostat, and a contact controlling supplemental room thermostat for rendering the low limit control inoperative when the room temperature rises to the setting of the supplemental room thermostat.

7. In combination, a high voltage electrical heater accelerator, a low voltage relay in control thereof, a contact controlling room thermostat for operating the relay to maintain a pre-determined room temperature, a contact controlling low limit control responsive to heater conditions at a pre-determined low limit for operating said relay to maintain a pre-determined minimum temperature at the heater irrespective of the temperature at the room thermostat, and a contact controlling supplemental room thermostat for preventing operation of the relay by the low limit control when the room temperature rises to the setting of the supplemental room thermostat.

8. In combination, an electrical heater accelerator, a low voltage relay in control thereof, a room thermostat and a low limit control wired in parallel and connected with the relay in such a manner that either may operate the relay to energize the electrical heater accelerator when the temperatures to which they respond drop below pre-determined minimums, and a supplemental room thermostat in series with the low limit control but not in circuit with the room thermostat for preventing operation of the relay to energize the electrical heater accelerator when the temperature of the room rises to the setting of the supplemental room thermostat.

9. In combination, an electrical heater accelerator, a room thermostat having hot and cold contacts for controlling the heater accelerator, a low limit control having hot and cold contacts responsive to heater conditions at a pre-determined low limit for operating the heater accelerator to maintain a pre-determined minimum temperature at the heater irrespective of the room temperature, and a supplemental room thermostat having hot and cold contacts for preventing continued operation of the heater accelerator by the low limit control when the supplemental room thermostat is in engagement with its hot contact and for preventing starting of the heater accelerator by the low limit control until the supplemental room thermostat is in engagement with its cold contact.

10. In combination, a high voltage electrical heater accelerator, a switch for controlling the operation thereof, a relay unit including a switch closing coil and a switch opening coil, a room thermostat for energizing said coils to maintain a pre-determined room temperature, a low limit control for energizing said coils to maintain a pre-determined minimum temperature at the heater irrespective of the temperature of the room thermostat, and a supplemental room thermostat for energizing the switch opening coil of the relay unit irrespective of the temperature at the low limit control when the temperature of the room rises to the setting of the supplemental room thermostat if the heater accelerator is in operation.

11. In combination, a high voltage electrical heater accelerator, a switch for controlling the operation thereof, a relay unit including a switch closing coil and a switch opening coil, a room thermostat including hot and cold contacts, a supplemental room thermostat including hot and cold contacts, a low limit control including hot and cold contacts, an energizing circuit for the switch closing relay coil including the cold contacts of the room thermostat, a second energizing circuit for the switch closing relay coil including the cold contact of the low limit control and the cold contact of the supplemental room thermostat in series, an energizing circuit for the switch opening relay coil when the heater accelerator is operating including the hot contact of the room thermostat and the hot contact of the low limit control in series, and a second energizing circuit for the switch opening relay coil when the heater accelerator is operating including the hot contact of the supplemental room thermostat.

12. In combination, an electrical heater accelerator, a room thermostat including sequentially engageable contacts for operating the heater accelerator to maintain a pre-determined minimum room temperature, a low limit control including sequentially engageable contacts for operating the heater accelerator to maintain a pre-determined minimum temperature at the heater, irrespective of the room temperature, and a supplemental room thermostat including sequentially engageable contacts for preventing operation of the heater accelerator by the low limit control when the temperature of the room is at or above the setting of the supplemental room thermostat.

13. In combination, a high voltage electrical heater accelerator, a normally open switch in control thereof, a relay for moving said switch to closed position when the relay is energized, a room thermostat including contacts sequentially engageable on temperature fall, a low limit control including contacts sequentially engageable on temperature fall, a supplemental room thermostat including contacts sequentially engageable on temperature fall, an energizing circuit for the relay including both contacts of the room thermostat, and a second energizing circuit for the relay including both contacts of the low limit control and both contacts of the supplemental room thermostat.

14. In combination, a high voltage electrical heater accelerator, a normally open switch in control thereof, a second normally open switch, a relay for moving said switches to closed position when energized, a room thermostat including contacts sequentially engageable on temperature fall, a supplemental room thermostat including contacts sequentially engageable on temperature fall, a low limit control including contacts sequentially engageable on temperature fall, an energizing circuit for the relay including all the room thermostat contacts, a second energizing circuit for the relay including all the supplemental room thermostat contacts and all of the low limit control contacts, a holding circuit for the relay including one of the room thermostat contacts and said second switch, and a second holding circuit for the relay including one of the contacts of the supplemental room thermostat, one of the contacts of the low limit control and said second switch.

15. The method of operating a heater which consists in placing acceleration of said heater under the control of variations in the heat delivery capacity of said heater upon fall of the temperature of the space to be heated to a pre-determined high minimum, removing such acceleration from such control upon fall of the temperature of such space to a predetermined lower minimum, and simultaneously placing such acceleration under the control of variations in the temperature of such space.

16. The method of operating a heater which consists in placing acceleration of said heater under the control of variations in the heat delivery capacity of said heater upon fall of the temperature of the space to be heated to a predetermined high minimum, removing such acceleration from such control upon fall of the temperature of such space to a predetermined lower minimum, and simultaneously placing such acceleration under the control of variations in the temperature of such space and removing such acceleration from such last-mentioned control upon rise of the temperature of such space to a predetermined maximum.

17. A heater accelerator, a low-limit control responsive to heater conditions at a predetermined low limit, a room thermostat, a supplemental thermostat, and intermediate connections between said accelerator, low-limit control, room thermostat, and supplemental thermostat whereby the heater accelerator will be activated upon attainment of a predetermined minimum position of the room thermostat or when both the supplemental thermostat and the low-limit control have attained predetermined minimum positions, and the heater accelerator will be put in non-accelerating position when both the room thermostat and low-limit control are satisfied.

18. In combination, a space to be heated, electrically-operated means in control of the heat supplied to said space, a thermostat responsive to the temperature of the space to be heated, a circuit for operating said electrically-operated means and controlled by said thermostat, a low-limit control responsive to the temperature of the heating medium, a second thermostat responsive to a temperature other than that of the heating medium and adapted to open a circuit when heated to a predetermined temperature, and the aforesaid last-mentioned circuit for controlling the electrically-operated means controlled by the low-limit control and second thermostat in series.

CARL M. MORGAN.